M. E. Mead,
Automatic Ventilator.

No. 90,180. Patented May 18, 1869.

Witnesses:
John F. Brooks
E. Greene Collins

Inventor:
Melville E. Mead
Pr Munn & Co
Attorneys

United States Patent Office.

MELVILLE E. MEAD, OF DARIEN DEPOT, CONNECTICUT.

Letters Patent No. 90,180, dated May 18, 1869.

AUTOMATIC VENTILATOR.

The Schedule referred to in these Letters Patent and making part of the same.

*To all whom it may concern:*

Be it known that I, MELVILLE E. MEAD, of Darien Depot, Fairfield county, Connecticut, have invented a new and improved Automatic Ventilator; and I do hereby declare that the following is a full, clear, and exact description thereof, which will enable others skilled in the art to make and use the same, reference being had to the accompanying drawings, forming part of the specification.

The present invention relates to a new and useful improvement in automatic ventilators for dwellings, stables, chimneys, &c., the object of which is, by so connecting the slats on opposite sides by rods running across between them, that the said slats may be simultaneously operated upon and closed by the force of the wind blowing against them on the windward side, and opened on the leeward side, thus enabling the ventilator to be kept open at all times on the leeward side; the construction and operation of which will be understood from the following description, reference being had to the accompanying drawing, forming part of this specification, in which—

Similar letters of reference indicate corresponding parts.

Figure 1:
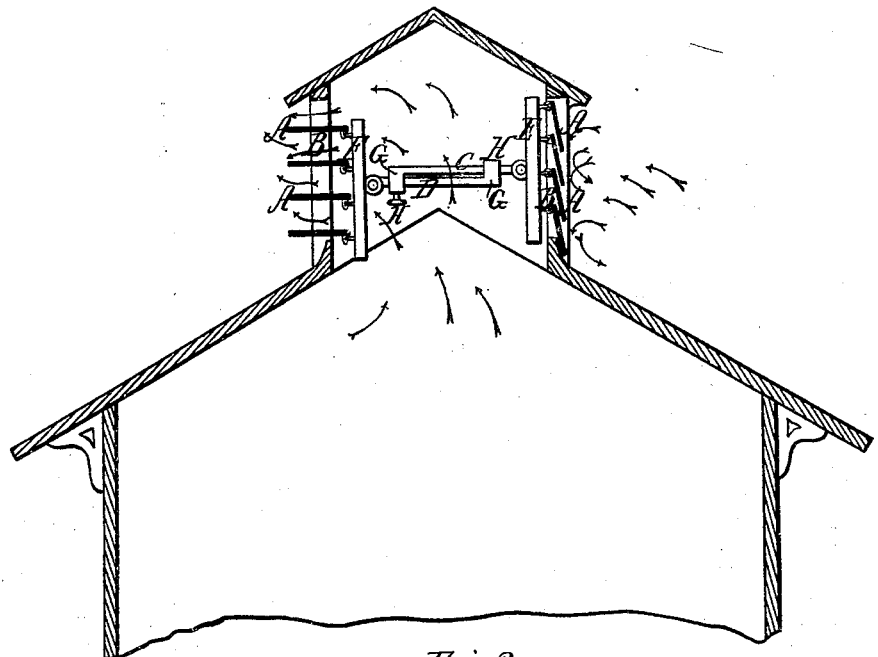
Figure 1 represents a cross-section through the line $x\ x$.
Figure 2:
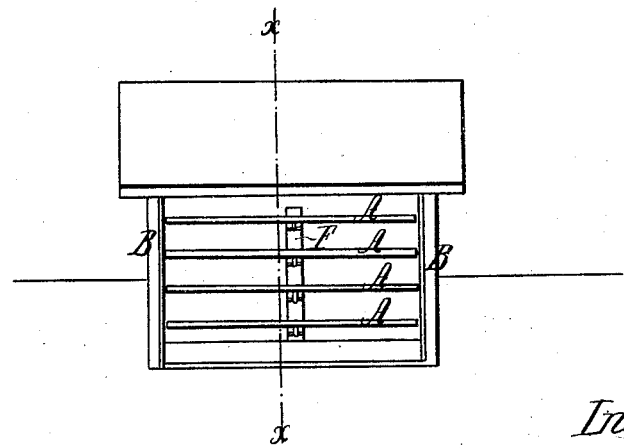
Figure 2 represents a side elevation of the same.

In this case the slats A are pivoted to the frame B in such a manner that their overhang will serve to counterbalance the weight of the rods C and D, which are secured to and connect the said slats with each other. These rods C and D are hinged respectively to the upright rods E and F, which are hinged in the usual manner to the slats A, the said rods being constructed with eyes G G on their inner ends, through which they pass and support themselves, as shown in the accompanying drawing. The amount of ventilation required is thus regulated by moving these rods C and D backward and forward, and they are held in such position by clamping the same with the thumb-screws H H.

I claim as new, and desire to secure by Letters Patent—

The automatic ventilator, consisting of the two oppositely-arranged series of pivoted slats connected by adjustable rods or bars, whereby they are adapted to operate substantially in the manner herein set forth, for the purpose specified.

The above specification of my invention signed by me, this 9th day of February, 1869.

MELVILLE E. MEAD.

Witnesses:
FRANK BLOCKLEY,
E. GREENE COLLINS.